US011683237B2

(12) United States Patent
Pronk et al.

(10) Patent No.: US 11,683,237 B2
(45) Date of Patent: Jun. 20, 2023

(54) METHOD TO ENHANCE SYSTEM ANALYSIS

(71) Applicant: KONINKLIJKE PHILIPS N.V., Eindhoven (NL)

(72) Inventors: Serverius Petrus Paulus Pronk, Vught (NL); Marc Andre Peters, Veldhoven (NL); Johannes Henricus Maria Korst, Eindhoven (NL); Mauro Barbieri, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/618,579

(22) PCT Filed: Jun. 17, 2020

(86) PCT No.: PCT/EP2020/066717
§ 371 (c)(1),
(2) Date: Dec. 13, 2021

(87) PCT Pub. No.: WO2020/254376
PCT Pub. Date: Dec. 24, 2020

(65) Prior Publication Data
US 2022/0263723 A1      Aug. 18, 2022

Related U.S. Application Data

(60) Provisional application No. 62/863,888, filed on Jun. 20, 2019.

(51) Int. Cl.
*H04L 41/14* (2022.01)
*H04L 41/12* (2022.01)
*H04L 41/22* (2022.01)

(52) U.S. Cl.
CPC .............. *H04L 41/14* (2013.01); *H04L 41/12* (2013.01); *H04L 41/22* (2013.01)

(58) Field of Classification Search
CPC ......... H04L 41/12; H04L 41/14; H04L 41/22; H04W 24/08; H04W 36/08; H04W 36/245; G16H 40/67
See application file for complete search history.

(56) References Cited

U.S. PATENT DOCUMENTS 7,792,956 B2    9/2010  Choong
9,125,046 B1 *  9/2015  Narayana ................ H04L 41/12
(Continued)

FOREIGN PATENT DOCUMENTS

EP     2568664 A1     3/2013
EP     3273637 A1 *   1/2018  ............ H04L 41/12
(Continued)

OTHER PUBLICATIONS

Brik, Vladimir, Arunesh Mishra, and Suman Banerjee. "Eliminating handoff latencies in 802.11 WLANs using multiple radios: Applications, experience, and evaluation." Proceedings of the 5th ACM SIGCOMM conference on Internet Measurement. (Year: 2005).*
(Continued)

*Primary Examiner* — John M MacIlwinen

(57) ABSTRACT

A wireless network comprises access points (APs) implementing roaming by way of handover of wireless devices between APs. Handover events over an analysis time interval are extracted from a wireless network log of the wireless network. Each handover event comprises a source AP from which a wireless device disconnects and a destination AP to which the wireless device connects. At least one handover frequency (HF) network topology graph is constructed fro the analysis time interval from the extracted handover events. The graph has nodes representing at least a subset of the APs of the extracted handover events and edges connecting pairs of nodes with each edge having a weight representing a count or frequency of handover events between the APs represented by the pair of nodes connected
(Continued)

by the edge. A network diagnostic or visualization task is performed using the HF network topology graph.

13 Claims, 4 Drawing Sheets

(56) References Cited

U.S. PATENT DOCUMENTS

| | | | |
|---|---|---|---|
| 2012/0201179 A1 | 8/2012 | Das | |
| 2017/0272319 A1* | 9/2017 | Sheen | H04W 24/02 |
| 2018/0213454 A1* | 7/2018 | Santhanam | H04W 36/0033 |
| 2020/0128441 A1* | 4/2020 | Singh | H04W 72/23 |
| 2020/0187023 A1* | 6/2020 | Hwang | H04W 24/10 |

FOREIGN PATENT DOCUMENTS

| | | |
|---|---|---|
| JP | 2010193322 A | 9/2010 |
| WO | WO2013122830 A1 | 8/2013 |

OTHER PUBLICATIONS

Gia, Tuan Nguyen, et al. "Fog computing approach for mobility support in internet-of-things systems." IEEE Access 6: 36064-36082. (Year: 2018).*

Kobayashi, Hideo, et al. "Towards sustainable heterogeneous wireless networks: A decision strategy for AP selection with dynamic graphs." Computer Networks 132: 99-107. (Year: 2018).*

Ramani, Ishwar, and Stefan Savage. "SyncScan: practical fast handoff for 802.11 infrastructure networks." Proceedings IEEE 24th Annual Joint Conference of the IEEE Computer and Communications Societies . . . vol. 1. IEEE. (Year: 2005).*

Shin, Minho, Arunesh Mishra, and William A. Arbaugh. "Improving the latency of 802.11 hand-offs using neighbor graphs." Second International Conference on Mobile Systems, Applications, and Services (MobiSys2004). (Year: 2004).*

PCT International Search Report, International application No. PCT/EP2020/066300, dated Aug. 4, 2020.

Fulop P. et al., "Mobility Management Framework", arxiv.org, Cornell University Li Bra Ry, 201 Olin Library Cornell University Ithaca, NY 14853, Oct. 2, 2008, XP080411680.

Kruskal J.B. et al., "On the Shortest Spanning Subtree of a Graph and the Travelling Salesman Problem", Proceedings of the American Mathematical Society, vol. 7, No. 1, pp. 48-50, 1956.

Younis M. et al., "Topology Management Techniques for Tolerating Node Failures in Wireless Sensor Networks: A Survey", Computer Networks 58 (2014), pp. 254-283.

Zhou Y. et al., "An Energy-Efficient Mechanism for Self-Monitoring Sensor Web", 2007 IEEE Aerospace Conference, Mar. 2007.

* cited by examiner

METHOD TO ENHANCE SYSTEM ANALYSIS

CROSS-REFERENCE TO PRIOR APPLICATIONS

This application is the U.S. National Phase application under 35 U.S.C. § 371 of International Application No. PCT/EP2020/066717, filed on Jun. 17, 2020, which claims the benefit of U.S. Application Ser. No. 62/863,888, filed on Jun. 20, 2019. These applications are hereby incorporated by reference herein.

FIELD

The following relates generally to the wireless networking arts, wireless networking diagnostic arts, wireless network analysis arts, medical data communications arts, medical information technology (IT) infrastructure arts, and related arts.

BACKGROUND

In hospitals and other healthcare environments, patient monitors are used to monitor the health of individual patients by continuously measuring various parameters such as vital signs (ECG, blood pressure, $SPO_2$, et cetera), medical therapy regimens (flow rate in intravenous fluid therapy et cetera), and so forth. Patient monitors are used especially in intensive care departments, operating rooms, recovery rooms, ambulances and other environments where the patient's health is at elevated risk.

Patient monitors, therapy devices, and/or other medical devices are often connected to electronic information centers via a wired and/or wireless communication network. Wireless connectivity is of particular value in areas with a high density of medical devices (intensive care departments, emergency rooms, et cetera) as wired medical devices can introduce trip hazards and limit mobility of patients and medical personnel. For wireless connectivity, the wireless network may be a dedicated clinical wireless communication network or a general purpose wireless network. The wireless network technology is often Wi-Fi, and the Wi-Fi network servicing medical devices may be a dedicated network for medical devices or may also service other communication needs in the hospital. For many routine clerical or other business tasks, Wi-Fi quality issues such as long latency times may be tolerable; however, for medical devices, uninterrupted, low-delay transport of patient data to the information centers is desired to facilitate surveillance of multiple patients by a single nurse by using an information center. The information center typically has one or more screens to display the data of multiple patients simultaneously.

To ensure reliability of the wireless network, especially for medical device communications (though not limited thereto), provision is made to monitor and troubleshoot possible problems, such as device failures or unacceptable delays in the communication network. For this purpose, an application monitor may be employed. An example of such an application monitor is the Philips PerformanceBridge® Focal Point on-premise management system available from Koninklijke Philips N.V. (formerly known as Philips FocusPoint). This application monitor executes on one or more server computers (possibly employing a cloud implementation) and is connected with the wireless network to continuously track the accessibility and performance of individual wireless and wired medical devices. Remote monitoring engineers (RMEs) and Remote Service Engineers (RSEs) in call centers can make use of Focal Point to investigate problems in the network by using the data gathered from the network.

In a large hospital or other sizable medical institution, the patient monitoring network (or networks) can be large and complex, presenting a substantial challenge to localize a problem from its symptoms in the data. The problem is enhanced in the case of a wireless network supporting mobile devices (e.g., medical devices on trolleys or secured to patient beds, which may move with an ambulatory patient or with a patient being transported on a gurney) since a moving wireless medical device is frequently handed over from one wireless access point (AP) to another. A typical troubleshooting approach employs a divide and conquer strategy in which the network is recursively split in parts and each sub-part is analyzed to determine if the issue is in that part. In this way, the fault can be progressively localized to identify a specific AP, router, hub, switch, or other malfunctioning network component.

Efficient implementation of a divide-and-conquer diagnostic strategy is assisted by an accurate understanding of the physical topology of the wireless network, especially the locations in two- or three-dimensional space of the APs. However, knowledge of the physical topology is often unavailable, or inaccurate and/or out-of-date. In a sizable medical institution, APs may frequently be added, removed, physically relocated, replaced with different/newer models, or so forth on an ad hoc basis.

The following discloses certain improvements.

SUMMARY

In some non-limiting illustrative embodiments disclosed herein, a network diagnostic system is disclosed for analyzing a wireless network comprising a plurality of access points (APs) implementing roaming by way of handover of wireless devices between APs. The network diagnostic system comprises an electronic processor and a non-transitory storage medium storing instructions readable and executable by the electronic processor to perform a network diagnostic method. The network diagnostic method includes: extracting a global handover frequency (HF) graph from counts of handover events over an analysis time interval in the wireless network wherein each handover event comprises a source AP from which a wireless device disconnects and a destination AP to which the wireless device connects; constructing a HF network topology graph for the analysis time interval from the extracted global HF graph wherein the HF network topology graph has nodes representing at least a subset of the APs of the extracted handover events and edges connecting pairs of nodes with each edge having a weight representing a count or frequency of handover events between the APs represented by the pair of nodes connected by the edge; and performing a network diagnostic or visualization task using the HF network topology graph.

In some non-limiting illustrative embodiments disclosed herein, a wireless network comprises a plurality of APs configured to implement roaming by way of handover of wireless devices between APs, and a network diagnostic system as set forth in the immediately preceding paragraph. In some embodiments, the plurality of APs are configured to implement a Wi-Fi network.

In some non-limiting illustrative embodiments disclosed herein, a diagnostic method is performed in conjunction with a Wi-Fi network comprising a plurality of APs. The diagnostic method comprises: constructing or retrieving from memory a HF network topology graph having nodes representing APs and edges connecting pairs of nodes wherein the edges have weights representing counts or frequencies of handover events between the APs represented by the connected pair of nodes; creating a rendering of the HF network topology graph; and displaying the rendering on a display.

In some non-limiting illustrative embodiments disclosed herein, a non-transitory storage medium stores instructions readable and executable by an electronic processor to perform a diagnostic method for analyzing a wireless network comprising a plurality of APs implementing roaming by way of handover of wireless devices between APs. The diagnostic method comprises: constructing a HF network topology graph from handover events in the wireless network wherein the HF network topology graph has nodes representing APs and edges connecting pairs of nodes with weights representing counts or frequencies of handover events between the APs represented by the connected pairs of nodes; and performing a network diagnostic or visualization task using the HF network topology graph.

One advantage resides in providing a wireless network with improved network topology information that is more informative than a physical network topology based solely on the physical locations of wireless access points.

Another advantage resides in providing a wireless network with network topology information automatically derived from roaming behavior of wireless devices on the network.

Another advantage resides in providing a wireless network with network topology information that is derived without tedious human effort.

Another advantage resides in providing a wireless network with network topology information that reflects actual performance of wireless access points of the wireless network.

Another advantage resides in providing a wireless network with network topology information that can be generated for user-chosen time intervals.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Figure 1:
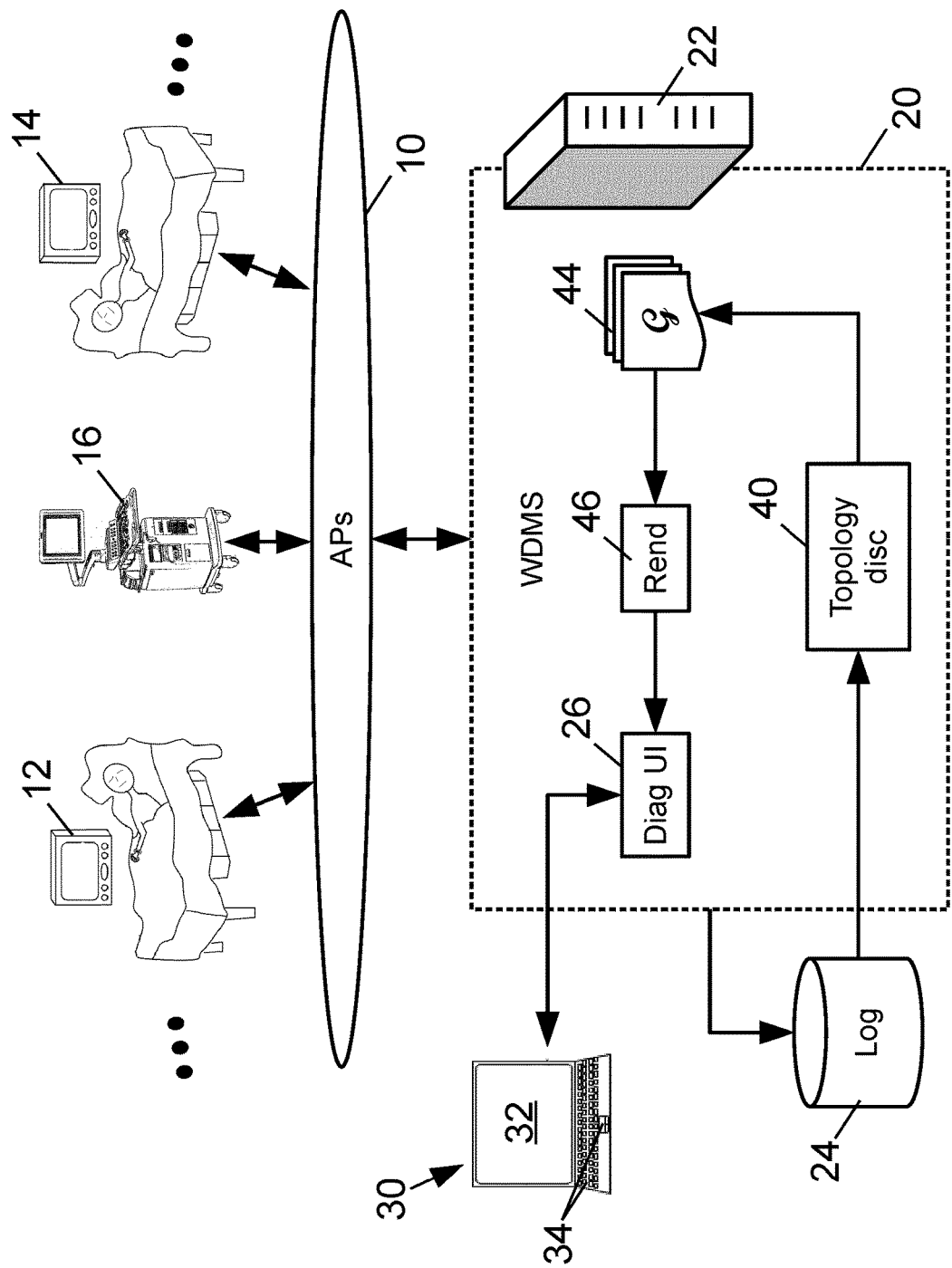
FIG. 1 diagrammatically illustrates a Wireless Devices Management System (WDMS) having network topology discovery capability and providing network diagnostics employing the discovered network topology.

As noted previously, efficient implementation of a divide-and-conquer diagnostic strategy is assisted by an accurate understanding of the physical topology of the wireless network, especially the locations in two- or three-dimensional space of the APs. However, knowledge of the physical topology is often unavailable, or inaccurate and/or out-of-date. In a sizable medical institution, APs may frequently be added, removed, physically relocated, replaced with different/newer models, or so forth on an ad hoc basis. Attempting to construct and maintain an up-to-date map of the physical locations of the APs distributed throughout a medical institution would be a time consuming and laborious task which is prone to error.

Moreover, it is recognized herein that the physical network topology is not optimal for performing network diagnosis. This is because the effective range of the wireless connectivity of an AP can vary due to numerous (and often interrelated) factors impacting the radio frequency (RF) signal, such as physical RF barriers, RF interference from other APs or other RF interference sources, the operating RF channel, RF radio characteristics, and so forth. The effective range of the wireless connectivity of an AP can vary over time (e.g., impacted by when some other RF interference source is operating and its transmission strength) and can be directionally dependent. Hence, even if an up-to-date map of the physical locations of the APs is available, such a map would not be ideal for diagnostic purposes such as identifying partitions of the network for divide-and-conquer diagnosis.

In embodiments disclosed herein, network topology discovery and rendering approaches are disclosed. These approaches leverage data acquired about handover events in which a wireless medical device is handed over from one AP to another AP. Such handover events are the mechanism by which a wireless device can roam about the medical institution—as the device moves further away from the AP to which it is currently (wirelessly) connected, the RF signal weakens; concurrently, the signal strength to some other AP may be increasing, e.g. if the device is moving toward that other AP. The Wi-Fi network provides standard protocols by which a handover occurs in which the moving device disconnects from its current AP and connects to the new AP with stronger RF signal strength (i.e., the device is handed off from the one AP to the next AP). Such handover events are routinely recorded by a Wireless Devices Management System (WDMS) and/or by backbone systems of the Wi-Fi network itself. The disclosed network topology discovery techniques are premised on the observation herein that if two APs have frequent handovers of devices between them, then the two APs are physically close together and, more importantly, are close together in the sense of providing significantly overlapping wireless coverage areas. To provide an example, consider two APs designated AP(i) and AP(j). If there are many handover events of devices from AP(i) to AP(j) and vice versa, then it follows that AP(i) and AP(j) have significantly overlapping wireless coverage areas. Conversely, if there are never any handover events from AP(i) to some other AP(k) or vice versa, then it follows that AP(i) and AP(k) have coverage areas that do not have any significant overlap.

Accordingly, as disclosed herein, a network topology is discovered by analysis of the log of handover events maintained by the WDMS and/or the network backbone system. This network topology can be discovered in a completely automated fashion by leveraging existing handover events log data, thus eliminating the laborious construction of a physical map of AP locations. Moreover, the discovered network topology is more useful for network analysis than would be a physical map of AP locations. This is because the discovered network topology automatically and empirically accounts for directional dependency of the effective ranges of the wireless connectivity of the respective APs, as these factors naturally impact the handover frequencies between pairs of APs. In a variant aspect, the time interval of the handover events log used to generate the network topology can be varied, with different network topologies discovered from different log time intervals, in order to investigate time variations in the network topology so as to potentially isolate an intermittent network problem.

The network topology discovered from analysis of handover events log data as disclosed herein is referred to herein as a handover frequency network topology, or "HF network topology" in order to distinguish it from a physical network topology that represents the physical locations of the APs. As just explained, the HF network topology advantageously captures directional (and optionally also temporal) dependence of the wireless coverage ranges of the APs in a way that a physical network topology cannot, thus making the HF network topology disclosed herein especially useful for network diagnostic tasks such as divide-and-conquer fault localization.

With reference to FIG. 1, a wireless network includes a plurality of wireless access points (APs) 10, which are distributed in area(s) of a hospital or other medical institution where access to the wireless network is intended to be provided. This may be the entire hospital, or only selected portions. Each of the APs 10 includes a wireless transceiver and is configured to communicate with wireless devices 12, 14, 16 on the wireless network. In addition to the APs 10, the wireless network may optionally include other conventional components not shown in FIG. 1 such as routers, hubs, network switches, and/or so forth to provide wired and/or wireless connection of the APs 10 to a network backbone implemented on one or more server computers (optionally cloud-based), to other wired and/or wireless networks and/or the Internet, or so forth as is known in the art. In some embodiments, the wireless network is a Wi-Fi network in which the APs 10 communicate with the wireless devices 12, 14, 16 using an IEEE 802.11-compliant wireless communication protocol. However, this is merely an illustrative example and it is contemplated for the wireless network to be configured in accordance with another wireless standard such as WiMax employing an IEEE 802.16-compliant wireless communication protocol or Wireless Medical Telemetry Service (WMTS). The illustrative wireless devices are wireless medical devices, such as illustrative patient monitors 12, 14 and an illustrative ultrasound scanner 16. These are merely illustrative examples of wireless devices, and more generally the wireless devices may be any type of wireless medical device (e.g. ECG monitors, $SPO_2$ monitors, or so forth, medical therapy devices such as an intravenous (IV) infusion pump, a hub node of a medical body area network (MBAN), and/or so forth. Even more generally, while the disclosed network topology discovery approaches are described in the context of a wireless network for medical devices, it is more broadly contemplated for the wireless devices communicating with the APs 10 of the wireless network to be wireless devices which are not medical devices, e.g. tablet computers, notebook computers, cellular telephones ("cellphones"), streaming media players with Wi-Fi connectivity, and/or so forth.

The illustrative wireless network further includes a Wireless Devices Management System (WDMS) 20 which comprises an application program (or suite of application programs) running on an electronic processor 22 (e.g. a server computer, a cluster of server computers, a cloud computing resource, various combination thereof, or so forth) for providing functionality such as generating network statistics and key performance indicators (KPIs), generating network fault alerts, performing network capacity analyses, hardware and software auditing, and/or so forth. In some embodiments, the WDMS 20 is implemented as an installation of the Philips PerformanceBridge® Focal Point on-premise management system available from Koninklijke Philips N.V., although this is merely an illustrative example. In some embodiments, the WDMS 20 is a general-purpose wireless network management system that is not specific to the medical domain. Among its various functions, the WDMS 20 maintains a wireless network log 24 which is stored on a non-transitory storage medium. While a single network log 24 is illustrated and referred to therein, it is contemplated that the network log 24 may be logically implemented as multiple logs storing different types of data or storing the same data with different sortings/formats/et cetera; and/or the network log 24 may be physically stored in multiple segments on different storage media. It will be further appreciated that the WDMS 20 is implemented as instructions stored on a non-transitory storage medium (which may be the same as or different from the non-transitory storage medium on which the network log 24 is stored), the stored instructions being readable and executable by the electronic processor 22 to implement the WDMS 20. The non-transitory storage medium or media may, by way of non-limiting illustrative example, comprise a hard disk or other magnetic storage medium, a solid state drive (SSD), flash memory, or other electronic storage medium, an optical disk or other optical storage medium, various combinations thereof, and/or so forth. The WDMS 20 also generates a diagnostic user interface (UI) 26 with which information technology (IT) personnel or other user(s) interact via a desktop, notebook, or other computer or dumb terminal 30 having a display 32 and one or more user input devices 34 (e.g. an illustrative keyboard and trackpad, and/or a mouse, touch-sensitive overlay of the display 32, various combinations thereof, and/or so forth). For example, the user may interact with the diagnostic UI 26 via the computer or terminal 30 to retrieve and display graphs or other representations of KPIs, network statistics, usage forecasts, or other information collected and/or generated by the WDMS 20. Much of this information may be generated from content of the network log 24.

With continuing reference to FIG. 1, as disclosed herein the WDMS 20 is further capable of performing network topology discovery by analyzing handover events extracted from the wireless network log 24. Said another way, the instructions stored on the non-transitory storage medium (or media) are readable and executable by the electronic processor 22 to perform network topology discovery by analyzing handover events extracted from the wireless network log 24. This functionality is diagrammatically indicated in FIG. 1 by a network topology discovery block 40 that extracts handover events over an analysis time interval from the wireless network log 24 of the wireless network and constructs at least one handover frequency (HF) network topology graph 44 for the analysis time interval from the extracted handover events. The HF network topology graph(s) 44 may be stored in memory (that is, may be stored on a non-transitory storage medium) and later retrieved from the memory. A rendering engine 46 optionally renders a graphical representation of the HF network topology graph 44. The graphical representation may be displayed on the display 32 which is operatively connected with the electronic processor 22.

Figure 2:
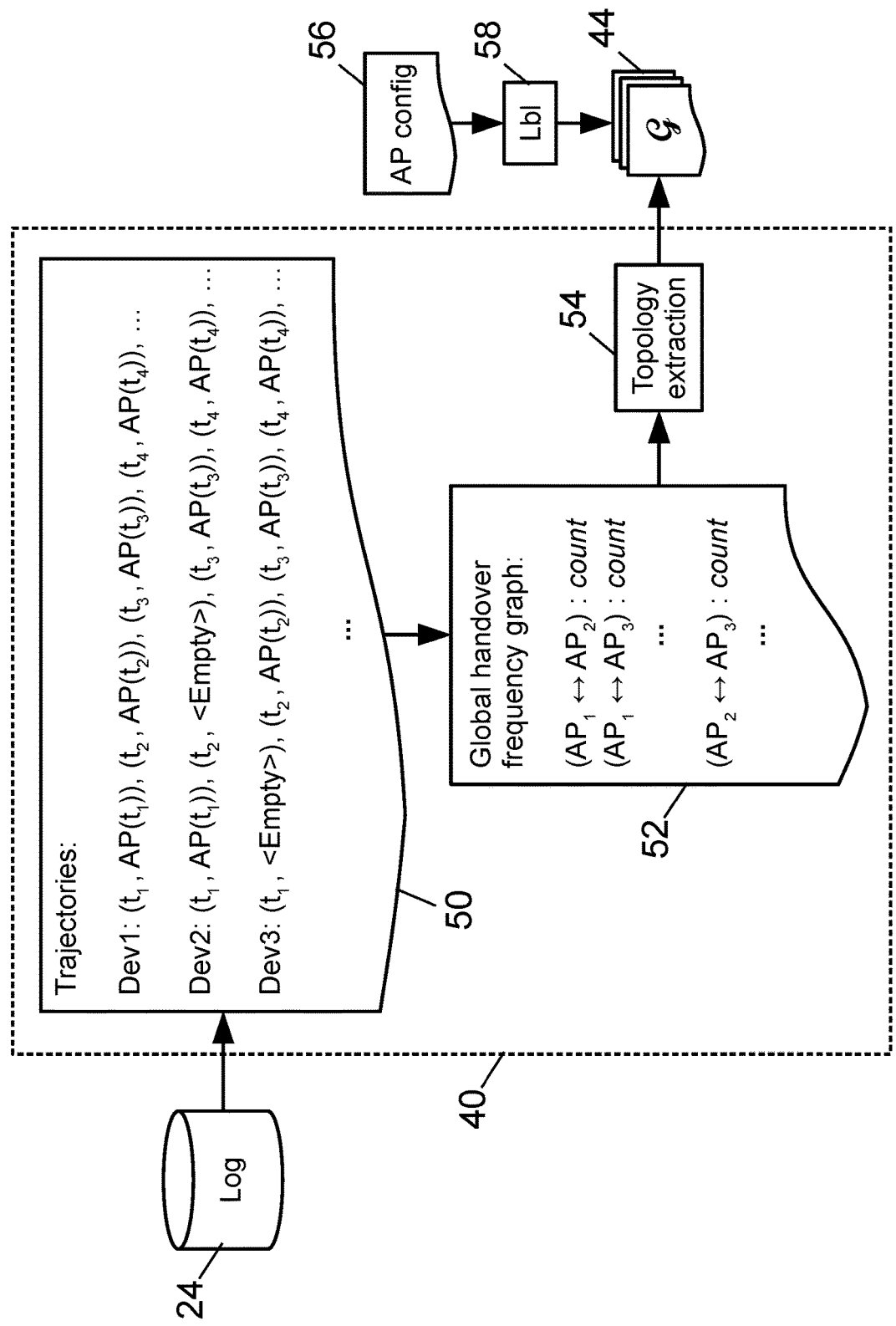
FIG. 2 diagrammatically shows an illustrative method of network topology discovery suitably performed by the WDMS of FIG. 1.

With continuing reference to FIG. 1 and with further reference to FIG. 2, a method suitably performed by the network topology discovery block 40 is described. The first step is to extract handover events from the wireless network log 24. Each handover event comprises (or is suitably defined in terms of) a source AP from which a wireless device (e.g. one of the devices 12, 14, 16 of FIG. 1) disconnects and a destination AP to which the wireless device connects. The detailed operation of the handover events extraction depends on the nature of the logged data. For example, if both the AP disconnect and AP connect actions are logged as a grouped pair, then the handover events extraction merely retrieves those grouped pairs.

In the illustrative example of FIG. 2, however, the logged data is a timestamped connection action, that is, the action in which a wireless device connects with an AP. The AP disconnect action is not logged in this example. Hence, in this example, for each wireless device, its roaming behaviour data consists of a list of timestamped connect events, i.e., pairs (t, v), indicating the time t at which the wireless device established a connection with the AP designated as v. This list, ordered in time, is referred to herein as the trajectory of the wireless device. Extracted data 50 shown in FIG. 2 thus includes a set of trajectories for devices designated "Dev1", "Dev2", "Dev3", . . . . The trajectories are collected for some analysis time interval, for example all data collected in the last month. Optionally, the analysis time window may be a sliding window, e.g. a sliding one-month window with data over one month old being discarded on a sliding basis. It is contemplated for the analysis time window to be the entire operating life to date of the wireless network, so that the extracted trajectory for each wireless device includes all APs it has ever been connected to since it was installed in the system. The time-wise successive elements of the trajectory denote successive connections, and handover events are then defined by adjacent pairs of (t, v) values. By way of illustrative example, the partial sequence . . . $(t_{i-1}, v_{i-1})$, $(t_i, v_i)$, $(t_{i+1}, v_{i+1})$ . . . defines: a first handover event in which the AP designated as $v_{i-1}$ is the source AP from which the device disconnects and the AP designated as $v_i$ is the destination AP to which the device connects; and a second handover event in which the AP designated as $v_i$ is now the source AP and the AP designated as $v_{i+1}$ is the destination AP.

The handover events extraction process as described thus far assumes that the wireless device remains connected to the wireless network. This is not always the case. For example, a wireless patient monitor may be connected to an AP designated $v_x$, then taken off the network for some period of time (for example, the patient is discharged and the patient monitor is temporarily disconnected from the network), and then later connected to some other AP designated $v_y$ (for example, when it is now connected to a newly admitted patient). The resulting sequence of connection events . . . $(t_x, v_x)$, $(t_y, v_y)$ . . . does not represent a handover event from $v_x$ to $v_y$—indeed, those two APs may be in completely different parts of the hospital and so widely separated that no handover could ever occur between them. To handle this situation, a placeholder "AP" can be designated, e.g. named EMPTY for ease of reference, and also treated as an AP and is used to indicate that the wireless device is not connected to any AP. The sequence of connection events thus becomes . . . $(t_x, v_x)$, (t_, EMPTY), $(t_y, v_y)$ . . . . The pair (t_, EMPTY) indicates that the monitor was disconnected from the last AP ($v_x$) without being connected to any new AP. Hence, a handover event from $v_x$ to $v_y$ is (correctly) not identified. With this modification, a trajectory for a wireless device comprises a time-ordered sequence of timestamped events (t, v) (where t is referred to as the timestamp here and v is the event, i.e. the action of connecting to the AP designated as v) in which each timestamped event of the trajectory is one of (i) a connection event in which the wireless device connects with an AP (designated as v in the illustrative notation) or (ii) a disconnection event in which the wireless device disconnects from all APs of the wireless network (indicated by the "connection" event (t_, EMPTY) in the illustrative notation).

The number of extracted handover events between each pair of APs, e.g. between $AP_x \leftrightarrow AP_y$ (where the double-headed arrow indicates counting both handovers from $AP_x$ to $AP_y$ and also handovers from $AP_y$ to $AP_x$) is then counted to create a global handover frequency (HF) graph 52. It will be appreciated that in FIG. 2 the global HF graph 52 is represented in a table or list form, but that this can be graphically visualized by plotting each AP as a node and adding edges between the nodes having respective weights corresponding to the counts, e.g. $AP_R \leftrightarrow AP_y$ can be represented by a node $AP_x$, a node $AP_y$, and an edge between these nodes labelled with the count of handover events $AP_x \leftrightarrow AP_y$.

In another approach, the extraction of the handover events and the construction of the graph can be combined as follows. The global HF graph 52 may be represented as a graph $\mathcal{G}_{global} = (V, E)$ where the set V of vertices consists of all the APs that occur in the trajectories. The set E of edges is constructed as follows. The trajectories of each wireless monitor m is used as follows. Let m's trajectory have length l and be given by $[(t_1, v_1), (t_2, v_2), \ldots, (t_1, v_1)]$. It is assumed that $t_i < t_{i+1}$ and $v_i \neq v_{i+1}$ for i=1, 2, . . . , l–1. For each i=1, 2, . . . , l–1, if there is not yet an edge $e=(v_i, v_{i+1})$ in E, it is created, added to E, and obtains a weight of 1. If it already exists in E, its weight is increased by 1.

The global HF graph 52 is not, in general, a connected graph. Usually, the global HF graph 52 consists of k≥1 mutually disconnected subgraphs. If k is chosen as large as possible, then each of the subgraphs is itself a connected graph. The global HF graph 52 may be disconnected for various reasons. The hospital may have areas that are not covered by APs, so that there is no way for a wireless device to roam from one AP to some other AP without temporarily disconnecting from the wireless network. Even if the entire hospital is covered by the wireless network, there may be regions between which no devices ever roam. For example, wireless devices may never move into, or out of, in a medical isolation ward, or devices may never move into, or out of, a maternity ward. (On the other hand, even if a wireless device never enters an area such as, e.g., a maternity ward, roaming to an AP in the maternity ward may still be possible and, if so, will likely happen occasionally). These factors can make the global HF graph 52 not ideal for visualization.

Accordingly, a topology extraction process 54 is performed. The topology extraction process 54 operates to segment the global HF graph 52 into one or (typically) more handover frequency (HF) network topology graphs 44, each of which is a connected graph, and/or extracting the HF network topology graph(s) 44 as maximum weight spanning trees. Each HF network topology graph has nodes representing at least a subset of the APs of the extracted handover events and edges connecting pairs of nodes with each edge having a weight representing a count or frequency of handover events between the APs represented by the pair of nodes connected by the edge. The terms "count" or "frequency" are functionally synonymous for a given analysis time interval. For example, if the analysis time interval is 30 days, one can represent the count of handover events for an edge between a given AP pair as the total count of handover events over the 30 days, or this count can be normalized to a "per day" value by dividing by 30 which then provides the (average) counts per day, which is a frequency value. Such normalization is not of significance as the relative values of the edges in the graph does not change.

Optionally, the topology extraction process 54 may remove any edges whose count or frequency is below some threshold value. This amounts to pruning the HF network topology graph 44 of low count (or low frequency) edges. Additionally or alternatively, a display threshold (e n) may be applied during the visualization stage. The pruning may optionally also remove nodes. For example, single nodes without any (unpruned) edges attached to them may be removed. In another variant, the pruning may remove small trees with only a few nodes, even if the edges still have weight greater than the threshold value.

The resulting HF network topology graph (or graphs) 44 advantageously provide a useful representation of the physical topology of the APs. Unlike such a purely physical topology which represents the actual distances between APs, the HF network topology graph 44 accounts for differences in the wireless connectivity ranges amongst the various APs, and represents functionally relevant information about which AP pairs engage in the most frequent handover events.

Advantageously, the network topology discovery process 40 is empirical as it operates on the counts of handover events (that is, the global HF graph 52) extracted from the wireless network log 24. This extraction is computationally efficient and uses information readily available in the network log 24. The extraction also does not require any user inputs (although an input such as a user-designated analysis time interval, and/or a pruning threshold, may optionally be provided). The extraction also does not require a hospital map or physical locations of the APs.

The HF network topology graph 44 can be computed for a user-chosen analysis time interval, so that for example if a network fault is identified which has been observed only for the last 24 hours then the network topology discovery process 40 can be applied for an analysis time interval of only the last 24 hours in order to visualize the network topology with the fault. Optionally, the network topology discovery process 40 can also be run for an earlier analysis time interval prior to when the network fault arose, and comparison of these "before and after" HF network topologies may localize the fault to the region where these two topologies differ.

While the network topology discovery process 40 does not require additional information beyond the extracted handover events, if additional information is available it can optionally be used to augment (e.g. annotate) the discovered HF network topology graph (or graphs) 44. For example, FIG. 2 diagrammatically indicates an AP configuration table 56 being used in a labeling process 58 to label APs of the HF network topology graph (or graphs) 44 with information about the APs contained in the AP configuration table 56.

Figure 3:
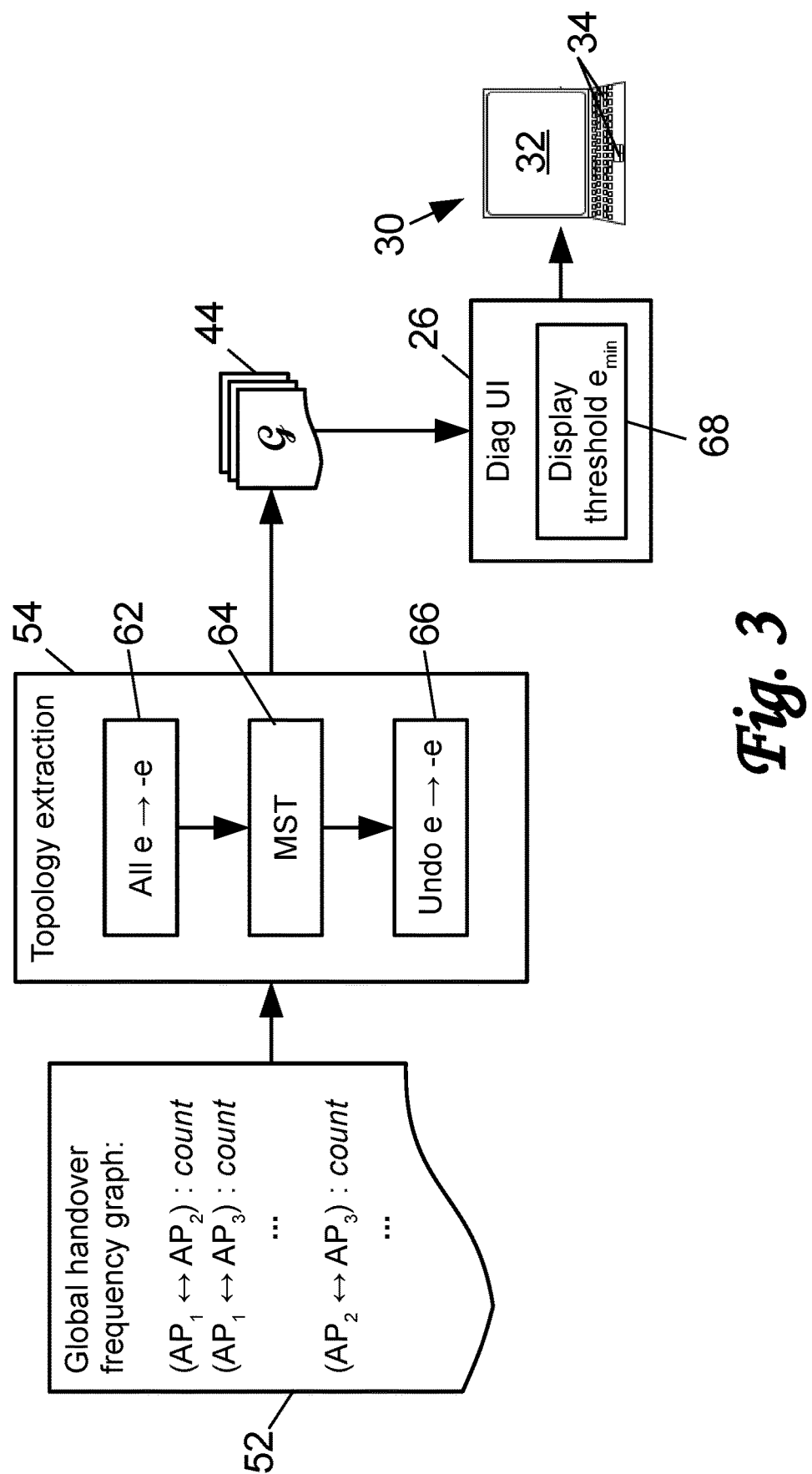
FIG. 3 diagrammatically shows an illustrative method of network topology rendering suitably performed by the WDMS of FIG. 1.

With reference to FIG. 3, an illustrative approach for generating and rendering the network topology graph(s) 44 is described. This illustrative topology extraction process 54 employs a maximum-weight spanning tree by making use of, e.g., Kruskal's algorithm (Kruskal, "On the shortest spanning subtree of a graph and the Travelling Salesman Problem", Proceedings of the American Mathematical Society, Vol. 7, No. 1, pp. 48-50, 1956). Since Kruskal's algorithm finds minimum weight spanning trees whereas it is desired here to find maximum weight spanning trees, the topology extraction process 54 includes an operation 62 of negating the weights (i.e. edge weight e→−e) for all edges of the global HF graph 52. Kruskal's algorithm is then applied in an operation 64 to generate one or more minimum weight spanning trees, with the weights inverted in sign per operation 62. Hence, the "minimum weights" are the largest negated weights (i.e. largest negative weights). In an operation 66, operation 62 is undone for the minimum weight spanning tree(s) (i.e. edge weight e→−e for all edges of the minimum weight spanning tree(s)) thus converting to maximum weight spanning tree(s) that serve as the HF network topology graph(s) 44. These are input to the diagnostic UI 26 and displayed on the display 32. Optionally, the diagnostic UI 26 includes a display threshold 68 which provides for not displaying edges of the maximum weight spanning tree whose weights are below some threshold $e_{min}$. Optionally, the user can adjust the display threshold $e_{min}$.

Note that if there is more than one minimum weight spanning tree in the global HF graph 52 (with edges inverted per operation 62), then Kruskal's algorithm applied in the operation 64 creates all the minimum weight spanning trees simultaneously. Hence, the application of Kruskal's algorithm in operation 64 advantageously serves to automatically segment the global HF graph 52 into spanning trees for the connected subgraphs contained in the global HF graph 52.

Figure 4:
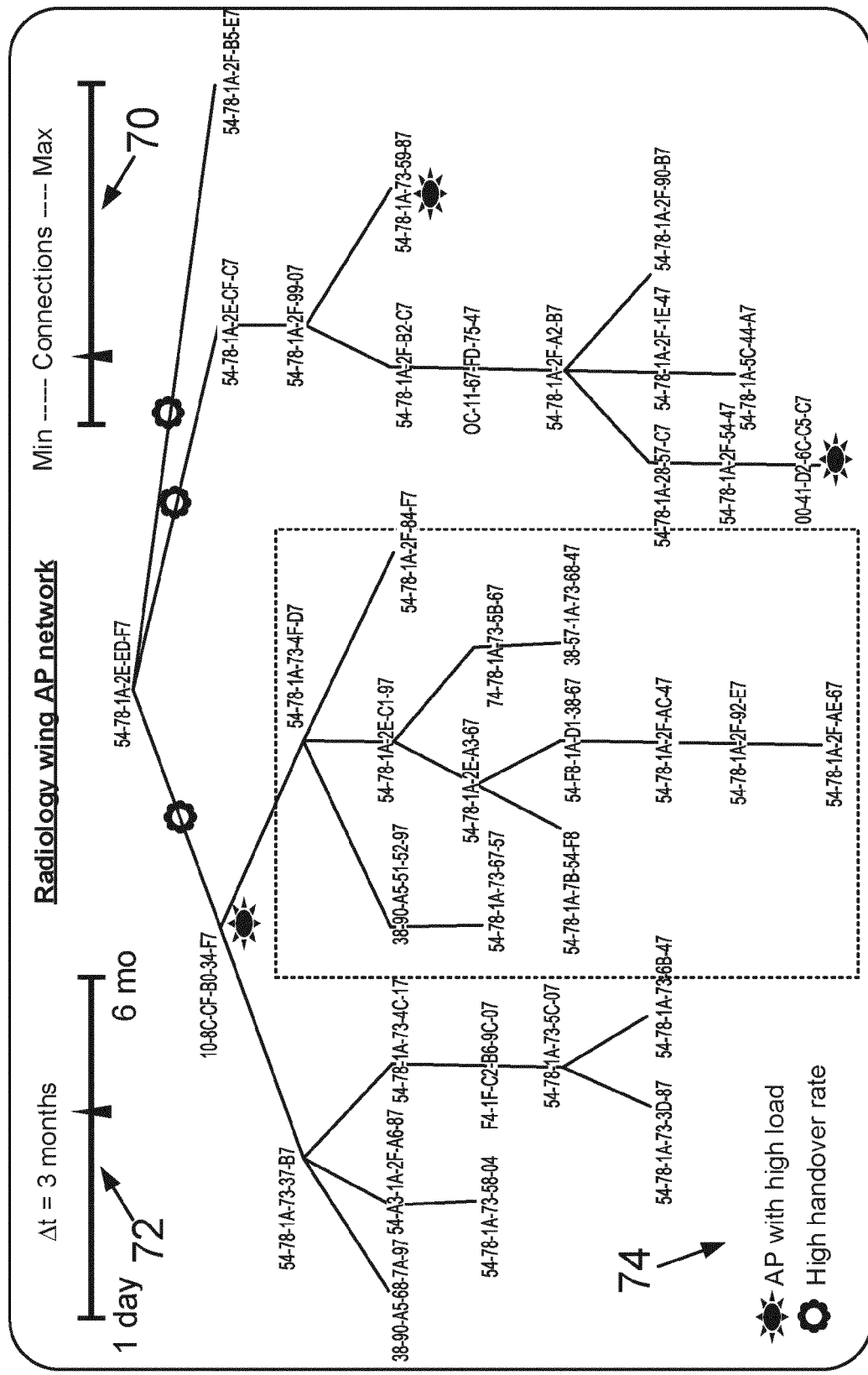
FIG. 4 diagrammatically shows an illustrative embodiment of the rendering output by the method of FIG. 3.

With continuing reference to FIG. 1 and with further reference to FIG. 4, an illustrative display of a maximum weight spanning tree generated by the topology extraction process 54 and presented on the display 32 by the diagnostic UI 26 is shown. In this example, each AP is represented by its MAC address of the form "xx-xx-xx-xx-xx-xx", and edges with weights above the display threshold 68 are shown. FIG. 4 is for a single selected connected graph, that is, for one graph of the HF network topology graph(s) 44. In the illustrative example of FIG. 4, this graph corresponds to the radiology wing AP network, as indicated in the title shown on the display 32. (This textual identification of the particular graph being rendered may, for example, be obtained from the AP configuration 56 as mentioned referencing FIG. 2).

Although not shown in the example of FIG. 4, it is contemplated for the edges of the rendered maximum weight spanning tree to have line widths corresponding to the edge weights, so as to graphically emphasize edges representing AP-AP connections with high handover frequency. A slider bar 70 provides a user input via which the user can adjust the display threshold 68: sliding the marker closer to the upper "Max" end lowers the display threshold emirs so as to show more connections, while sliding the marker closer to the lower "Min" end increases the display threshold emirs so as to show fewer connections. The analysis time interval may optionally also be adjusted using a slider 72. This approach is suitable if the topology discovery process 40 is sufficiently fast to enable approximately real-time updating. (If the update is too slow, then the analysis time interval may be input prior to the rendering; or in other embodiments the analysis time interval may be a fixed predetermined value; in either of such alternative cases the slider 72 would be omitted). As explained in a legend 74 in the lower left of the display 32, various features in the maximum-weight spanning tree may be denoted by defined symbols: in the illustrative example APs with high load are so denoted, as are AP-AP connections with high handover rate. Other features could be similarly denoted, such as APs and/or edges with a large change in handover frequency between two graphs computed for two different analysis time intervals (e.g., a first time interval before some problem was observed, and a second time interval after the problem was observed, so that the APs and/or edges with large change in handover frequency may be related to the observed problem).

The illustrative maximum-weight spanning tree rendering is an illustrative visualization approach. Alternative renderings could be employed for rendering the HF network topology graph 44. Another contemplated rendering is a gravitational model in which pairs of nodes are spaced apart by distances computed by balancing a repulsive force and an attractive force wherein the attractive force for each pair of nodes is scaled by the weight of the edge connecting the pair of nodes. Another contemplated rendering is a mapping of the nodes of the HF network topology graph 44 to positions on a hexagonal grid such that the total weighted distance between connected nodes is (at least approximately) minimized. Yet another contemplated rendering is a mapping of the nodes to the physical three-dimensional locations of the APs, with the links having line thicknesses representing the handover frequency weights (here it is assumed that a mapping of APs to physical locations is available). Again, these are merely further non-limiting illustrative rendering examples.

The topology discovery process 40 can be repeated on a, for example, periodic basis or upon request. In this way, the topology information can be kept up to date and extensions or changes can be incorporated. It is also noted that while the rendering 46 is one useful application of the discovered HF network topology graph(s) 44, other applications may consume the HF network topology graph(s) 44 without graphical rendering and display.

In the following, some wireless network diagnostics that can be performed using the HF network topology graph(s) 44 are described.

Failures in the system are reported by the WDMS 20 as alerts. Example alerts are Monitoring Drop-out, Device Rebooted, and Application Error. If an alert becomes active, action may have to be undertaken by technical personnel to identify the root cause. For large, complex networks, this may be a daunting task, especially if there are multiple alerts becoming active more or less simultaneously, or one alert becomes active for multiple devices more or less simultaneously. The availability of topology information as well as the current locations of the affected devices via the HF network topology graph(s) 44 enables an assessment of the locality and size of the problem at hand and allows to apply a 'divide and conquer' troubleshooting strategy. For example, if a number of monitors are involved, then by their current location, it can be established whether they are physically close to each other.

Network topology optimization applications can also benefit from the HF network topology graph(s) 44. By examining the maximum-weight spanning trees representing the various wireless networks, it can easily be detected how intensely a certain wireless network (or portion thereof) is being used in the sense that how much roaming occurs among neighboring APs. Advantageously, the HF network topology graph(s) 44 quantitatively represent the extent of roaming in terms of handover frequencies between the various AP-AP pairs. Excessive roaming may indicate low signal values or non-optimal positioning of APs in terms of distance or because of interfering objects. Excessive roaming can lead to data loss (which can be particularly problematic for critical patient data) and may result in a Monitoring Dropout alert. Applying changes to the topology can improve the quality of the network and reduce data loss and the number of alerts. Similarly, bottlenecks can be detected by analyzing the load on APs that are close together via renderings of the HF network topology graph(s) 44. It is thereby possible to identify regions of high load, where the placement of additional APs may be beneficial.

These are merely some non-limiting illustrative applications of the disclosed HF network topology graph(s) 44.

The invention has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A network diagnostic system for analyzing a wireless network comprising a plurality of access points, APs, implementing roaming by way of handover of wireless devices between APs, the network diagnostic system comprising:
   an electronic processor; and
   a non-transitory storage medium storing instructions readable and executable by the electronic processor to perform a network diagnostic method including:
      extracting a global handover frequency, HF, graph from counts or frequencies of handover events over an analysis time interval in the wireless network wherein each handover event comprises a source AP from which a wireless device disconnects and a destination AP to which the wireless device connects;
      constructing a HF network topology graph for the analysis time interval from the extracted global HF graph wherein the HF network topology graph has nodes representing at least a subset of the APs of the extracted handover events and edges connecting pairs of nodes with each edge having a weight representing a count or frequency of handover events between the APs represented by the pair of nodes connected by the edge; and
      performing a network diagnostic or visualization task using the HF network topology graph.

2. The network diagnostic system of claim 1 wherein the performing comprises:
   rendering a graphical representation of the HF network topology graph; and
   displaying the rendered graphical representation of the HF network topology graph on a display operatively connected with the electronic processor.

3. The network diagnostic system of claim 2 wherein the constructing of the HF network topology graph comprises:
   creating one or more maximum weight spanning trees for the global HF graph; and
   displaying a selected one of the one or more maximum weight spanning trees on the display.

4. The network diagnostic system of claim 2 wherein the rendering comprises:
   rendering the graphical representation of the HF network topology graph with pairs of nodes spaced apart by distances computed by balancing a repulsive force and an attractive force wherein the attractive force for each pair of nodes is scaled by the weight of the edge connecting the pair of nodes.

5. The network diagnostic system of claim 2 wherein the displaying of the rendered graphical representation of the HF network topology graph includes:

displaying a user dialog via which a user selects a pruning threshold; and displaying the rendered graphical representation of the HF network topology graph omitting any edges having weights less than the user-selected pruning threshold.

6. The network diagnostic system of claim 1 wherein:

the extracting and constructing are repeated for two different analysis time intervals whereby HF network topology graphs for the two different analysis time intervals are constructed; and the performing of the network diagnostic or visualization task includes comparing the HF network topology graphs for the two different analysis time intervals.

7. The network diagnostic system of claim 1 wherein the extracting of the global HF graph comprises:

for each of a plurality of wireless devices connected to the wireless network during the analysis time interval:
defining a trajectory for the wireless device comprising a time-ordered sequence of timestamped events in which each timestamped event of the trajectory is one of (i) a connection event in which the wireless device connects with an AP or (ii) a disconnection event in which the wireless device disconnects from all APs of the wireless network, and for each adjacent pair of timestamped events of the trajectory in which both events of the pair are connection events, extracting a handover event.

8. The network diagnostic system of claim 1 wherein the constructing comprises:

performing a topology extraction process on the global HF graph which segments the global HF graph into a plurality of mutually disconnected HF network topology graphs each including a subset of the APs of the global HF network topology graph.

9. The network diagnostic system of claim 1, further comprising a plurality of access points, APs, configured to implement roaming by way of handover of wireless devices between APs.

10. A computer-implemented diagnostic method performed in conjunction with a Wi-Fi network comprising a plurality of access points, APs, the diagnostic method comprising:

extracting a global handover frequency, HF, graph from counts or frequencies of handover events over an analysis time interval in the wireless network wherein each handover event comprises a source AP from which a wireless device disconnects and a destination AP to which the wireless device connects;

constructing a HF network topology graph for the analysis time interval from the extracted global HF graph, the HF network topology graph having nodes representing at least a subset of the APs of the extracted handover events and edges connecting pairs of nodes wherein the edges have weights representing counts or frequencies of handover events between the APs represented by the connected pair of nodes;

performing a network diagnostic or visualization task using the HF network topology graph;

creating a rendering of the HF network topology graph; and displaying the rendering on a display.

11. The diagnostic method of claim 10 wherein the constructing comprises:

creating at least one maximum weight spanning tree for the global HF graph;

wherein the displaying comprises displaying a selected one of the at least one maximum weight spanning tree on the display.

12. The diagnostic method of claim 11 wherein the displaying of the selected one of the at least one maximum weight spanning tree includes:

displaying a user dialog on the display via which a user selects a display threshold; and displaying the selected one of the at least one maximum weight spanning tree on the display omitting any edges having weights less than the user-selected display threshold.

13. The diagnostic method of claim 11 wherein the creating of the at least one maximum weight spanning tree includes pruning the at least one maximum weight spanning tree.

* * * * *